(12) United States Patent
Germain et al.

(10) Patent No.: US 10,049,474 B2
(45) Date of Patent: Aug. 14, 2018

(54) WELL ACTIVITY BAR CHARTS

(71) Applicant: Landmark Graphics Corporation, Houston, TX (US)

(72) Inventors: Olivier Germain, Houston, TX (US); Florin M. Anghelescu, Calgary (CA); Brian Mangold, Calgary (CA)

(73) Assignee: Landmark Graphics Corporation, Houston, TX (US)

( * ) Notice: Subject to any disclaimer, the term of this patent is extended or adjusted under 35 U.S.C. 154(b) by 6 days.

(21) Appl. No.: 14/907,013

(22) PCT Filed: Sep. 3, 2013

(86) PCT No.: PCT/US2013/057823
§ 371 (c)(1),
(2) Date: Jan. 22, 2016

(87) PCT Pub. No.: WO2015/034462
PCT Pub. Date: Mar. 12, 2015

(65) Prior Publication Data
US 2016/0163078 A1    Jun. 9, 2016

(51) Int. Cl.
| | | |
|---|---|---|
| G06F 17/21 | (2006.01) | |
| G06T 11/20 | (2006.01) | |
| G01V 1/00 | (2006.01) | |
| E21B 41/00 | (2006.01) | |
| G06F 3/0482 | (2013.01) | |
| G06F 3/0486 | (2013.01) | |

(52) U.S. Cl.
CPC .......... *G06T 11/206* (2013.01); *E21B 41/00* (2013.01); *G01V 1/003* (2013.01); *G06F 3/0482* (2013.01); *G06F 3/0486* (2013.01)

(58) Field of Classification Search
CPC .................................................. G06T 11/206
USPC ........................................................ 715/209
See application file for complete search history.

(56) References Cited

U.S. PATENT DOCUMENTS

| | | | | |
|---|---|---|---|---|
| 6,152,246 A | * | 11/2000 | King | E21B 44/00 175/26 |
| 7,353,183 B1 | * | 4/2008 | Musso | G06Q 10/00 705/313 |
| 7,529,742 B1 | | 5/2009 | Marsh et al. | |
| 7,650,294 B1 | | 1/2010 | Carter et al. | |
| 8,082,045 B1 | * | 12/2011 | Ashizawa | G05B 19/41865 700/121 |
| 9,792,571 B1 | * | 10/2017 | Mandava | G06Q 10/06393 |

(Continued)

FOREIGN PATENT DOCUMENTS

WO    WO 2012/134497 A1    10/2012

OTHER PUBLICATIONS

Wilson, James M. "Gantt charts: A centenary appreciation." European Journal of Operational Research 149, No. 2 (2003): 430-437.*

(Continued)

*Primary Examiner* — Frank D Mills
(74) *Attorney, Agent, or Firm* — Haynes and Boone, LLP

(57) ABSTRACT

A system and method to plan and represent well activities using bar charts, while also providing the option to select specific time periods in which to represent the data and/or to compare the data with other wells. Additionally, the system provides the ability to chart a well activity plan and to edit an existing plan.

16 Claims, 8 Drawing Sheets

(56) References Cited

U.S. PATENT DOCUMENTS

| | | | |
|---|---|---|---|
| 2002/0103630 A1* | 8/2002 | Aldred | E21B 44/00 703/10 |
| 2003/0078931 A1 | 4/2003 | Bevc et al. | |
| 2004/0124009 A1* | 7/2004 | Hoteit | G06N 7/005 175/25 |
| 2005/0097536 A1* | 5/2005 | Bernstein | H04L 41/22 717/156 |
| 2006/0200372 A1* | 9/2006 | O'Cull | G06Q 10/06 705/7.22 |
| 2007/0276901 A1 | 11/2007 | Glinsky et al. | |
| 2009/0089028 A1 | 4/2009 | Sagert et al. | |
| 2009/0193353 A1* | 7/2009 | Sharp | G06Q 10/06 715/784 |
| 2009/0234623 A1* | 9/2009 | Germain | E21B 41/00 703/6 |
| 2010/0036824 A1 | 2/2010 | Gu et al. | |
| 2010/0206559 A1 | 8/2010 | Sequeira et al. | |
| 2010/0211423 A1* | 8/2010 | Hehmeyer | G01V 1/40 702/6 |
| 2010/0271232 A1 | 10/2010 | Clark et al. | |
| 2010/0299171 A1* | 11/2010 | Lau | G06Q 10/06 705/7.15 |
| 2010/0305994 A1* | 12/2010 | Gaskell | G06Q 10/06 705/7.23 |
| 2013/0083031 A1* | 4/2013 | Lehnherr | G06Q 50/02 345/440 |
| 2013/0144531 A1* | 6/2013 | Johnston | E21B 44/00 702/9 |
| 2013/0297370 A1* | 11/2013 | Pegden | G06Q 10/06311 705/7.26 |
| 2014/0039793 A1* | 2/2014 | Querales | E21B 47/00 702/6 |
| 2014/0075390 A1* | 3/2014 | Gauthier | G06Q 10/0631 715/840 |
| 2014/0116776 A1* | 5/2014 | Marx | E21B 44/00 175/24 |
| 2014/0291023 A1* | 10/2014 | Edbury | E21B 44/00 175/24 |
| 2014/0325423 A1* | 10/2014 | Mohammad | G06Q 10/06 715/772 |
| 2014/0344301 A1* | 11/2014 | McDonough | G06Q 10/06 707/758 |
| 2015/0053483 A1* | 2/2015 | Mebane, III | E21B 44/00 175/26 |
| 2015/0220861 A1* | 8/2015 | Sanchez | G06Q 10/06 705/7.27 |

OTHER PUBLICATIONS

Clark, Wallace, Walter Nicholas Polakov, and Frank W. Trabold. The Gantt chart: A working tool of management. Ronald Press Company, 1922. (Year: 1922).*

International Search Report and The Written Opinion of the International Searching Authority, or the Declaration, dated Mar. 18, 2014, PCT/US2013/057823, 10 pages, ISA/US.

* cited by examiner

WELL ACTIVITY BAR CHARTS

The present application is a U.S. National Stage patent application of International Patent Application No. PCT/US2013/057823, filed on Sep. 3, 2013, the benefit of which is claimed and the disclosure of which is incorporated herein by reference in its entirety.

FIELD OF THE DISCLOSURE

The present disclosure relates generally to graphical representation of rig activities and, more specifically, to a system that represents rig activities using bar charts while providing time period selection and comparison with other well data.

BACKGROUND

In hydrocarbon exploration, accurately understanding the economic projections of a reservoir is vitally important. Conventional approaches to such analysis include the use well planning or comparison tables containing well related data used to conduct such analysis. The tables would require the use to scroll up/down, read the data on the table format, and then select reports describing various well activities. The user would then have to open the report to read the details.

However, such conventional approaches are problematic in that the user has no visual representation of the drilling progress or the ability to compare well data. In addition, there is no capability to provide real-time data to update well activities or any template for accurate well planning.

In view of the foregoing, there is a need in the art for a system providing efficient navigation and visual representations of the drilling progress and the ability to compare real-time well data.

DESCRIPTION OF ILLUSTRATIVE EMBODIMENTS

Illustrative embodiments and related methodologies of the present disclosure are described below as they might be employed in a system that represents rig activities using bar charts. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of this disclosure will become apparent from consideration of the following description and drawings.

Figure 1:
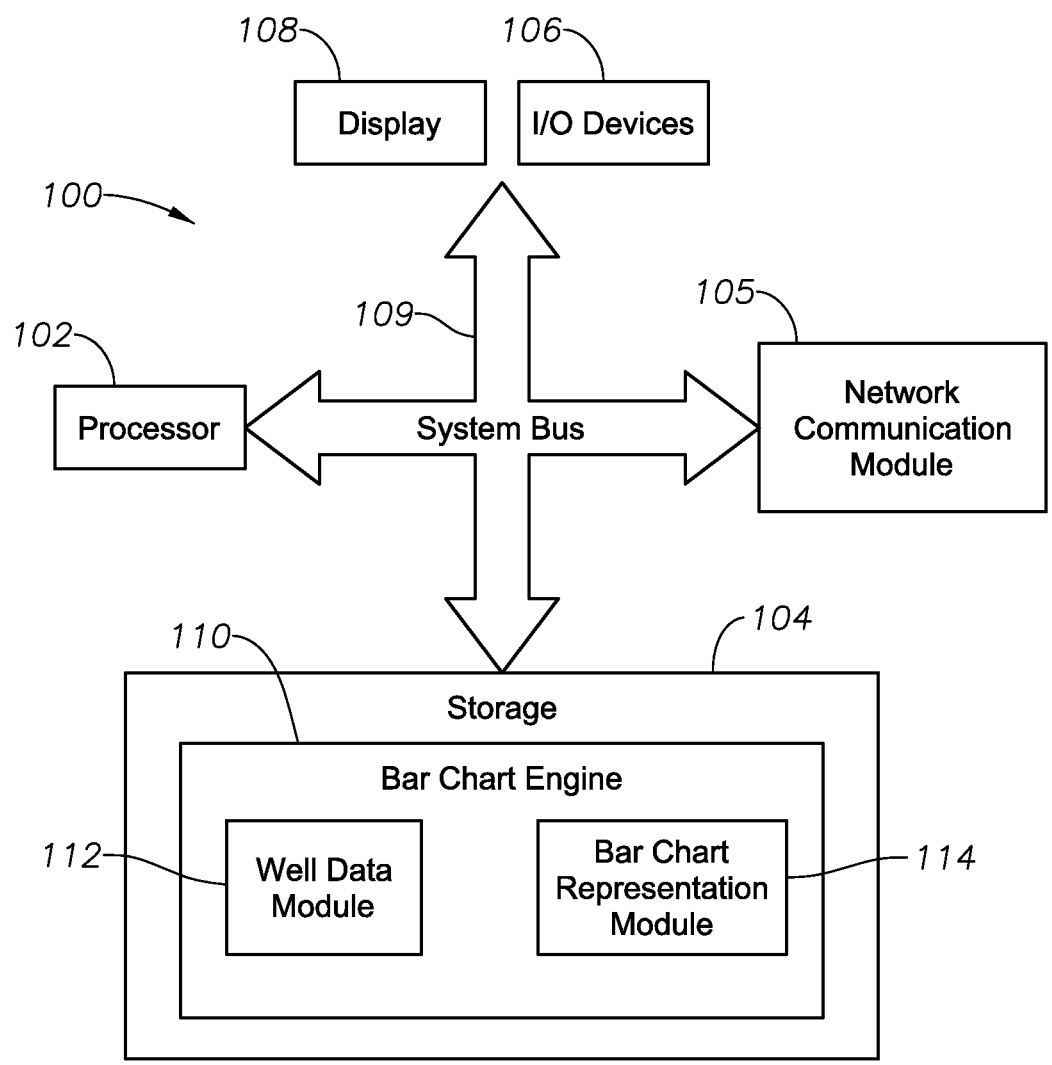
FIG. 1 illustrates a block diagram of a bar chart well representation system according to certain illustrative embodiments of the present disclosure.

FIG. 1 shows a block diagram of a bar chart well representation ("BCWR") system 100 according to certain exemplary embodiments of the present disclosure. As will be described herein, exemplary embodiments of the present disclosure provide a platform to plan and represent well activities using bar charts, while also providing the option to select specific time periods in which to represent the data and/or to compare the data with other wells. Additionally, the system provides the ability to chart a well activity plan and to edit an existing plan. In operation, the system displays a user-customizable well activity listing that includes a plurality of well activities in chronological order. Each well activity is assigned an event bar that charts the respective well activity's occurrence over a specified time period, which may be adjusted as desired. The events bar may be updated in real-time with actual well data to reflect the actual time a well event is taking and/or other relevant well data. Accordingly, the disclosed system provides a user-friendly method by which to represent well activities.

Referring to FIG. 1, exemplary BCWR system 100 includes at least one processor 102, a non-transitory, computer-readable storage 104, transceiver/network communication module 105, optional I/O devices 106, and an optional display 108 (e.g., user interface), all interconnected via a system bus 109. Software instructions executable by the processor 102 for implementing software instructions stored within bar chart engine 110 in accordance with the exemplary embodiments described herein, may be stored in storage 104 or some other computer-readable medium. Although not explicitly shown in FIG. 1, it will be recognized that BCWR system 100 may be connected to one or more public and/or private networks via one or more appropriate network connections. It will also be recognized that the software instructions embodying bar chart engine 110 may also be loaded into storage 104 from a CD-ROM or other appropriate storage media via wired or wireless methods.

Moreover, those ordinarily skilled in the art will appreciate that embodiments of this disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. This disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Still referring to FIG. 1, in certain exemplary embodiments, bar chart engine 110 includes well data module 112 and bar chart representation module 114. Well data module 112 provides real-time robust data capture, storage, retrieval and integration of well activity data. In other embodiments, well data module 112 may also process other reservoir related data that spans across all aspects of the well planning, construction and completion processes such as, for example, drilling, cementing, wireline logging, well testing and stimulation. Such data includes, for example, calibrated data received from well sensors, as well as data representing various petrophysical properties as understood in the art. Moreover, such data may include, for example, casing, cementing, cost estimating, open hole logging, well trajectories, surface, or fault data, as well as other data from surrounding wells. The database (not shown) which stores this data may reside within well data module 112 or at a remote location. An exemplary database platform is, for example, the OpenWells® software suite, commercially offered through Landmark Graphics Corporation of Houston Tex. Additionally, well monitoring capability and data integration may be provided by a platform such as, for example, the MaxActivity™ rig floor monitoring software, commercially available through Halliburton Energy Services Co. of Houston, Tex. Those ordinarily skilled in the art having the benefit of this disclosure realize there are a variety of software platforms and associated systems to retrieve, store and integrate the well related data, as described herein.

Still referring to the exemplary embodiment of FIG. 1, bar chart engine 110 also includes bar chart representation module 114 that provides visualization of the data contained within well data module 112 in the form of a bar chart such as, for example, a Gantt chart. As a result, bar chart representation module 114 represents, creates and allows editing of the Gantt chart, along with the option to zoom in on a specific time period and/or to compare the progress with another well on the same chart. However, those ordinarily skilled in the art having the benefit of this disclosure realize a variety of other bar chart visualization platforms may also be utilized with the present disclosure. Moreover, in certain other embodiments, bar chart engine 110 may also include multi-domain workflow automation capabilities that may connect any variety of desired technical applications.

Figure 2A:
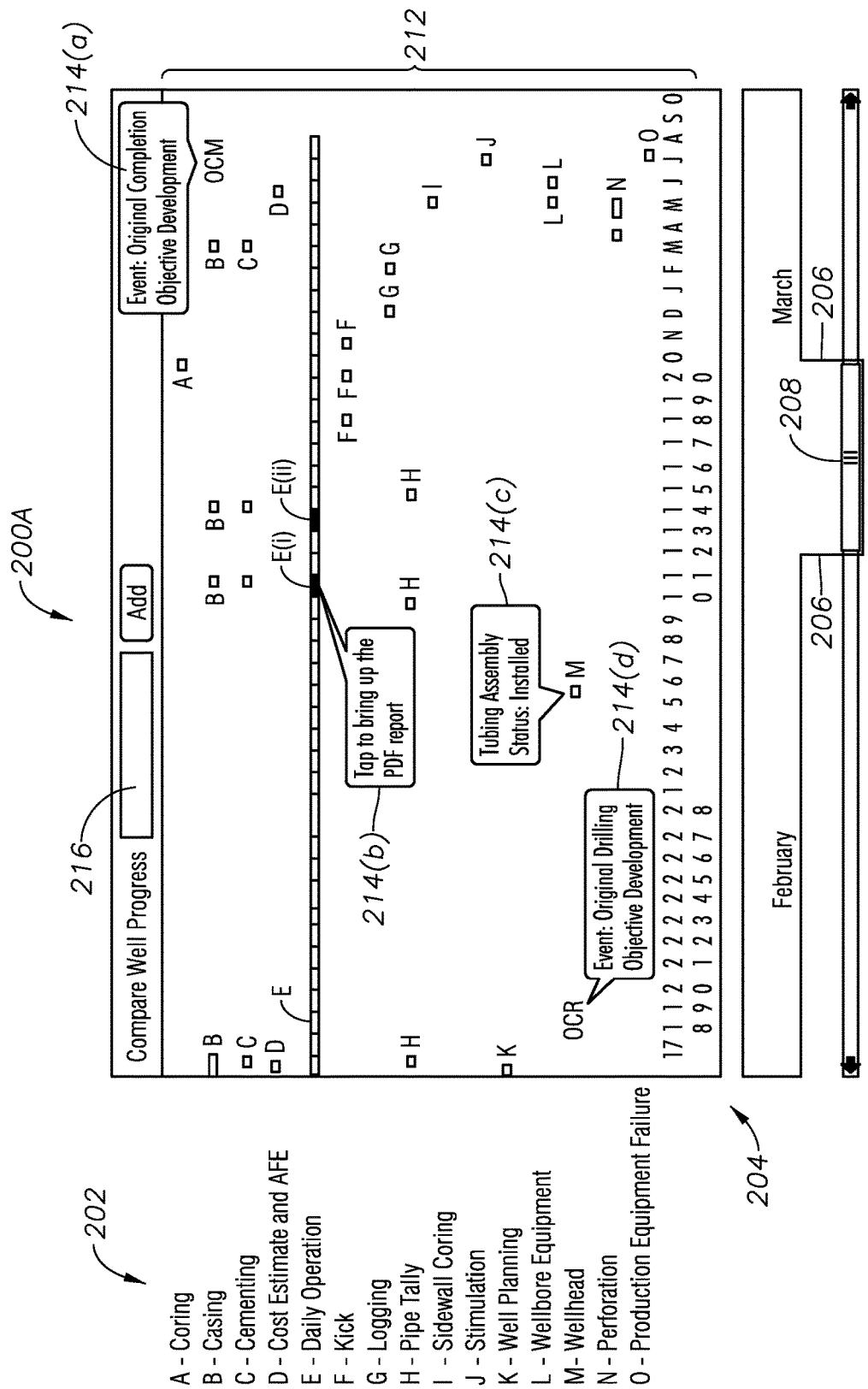
FIG. 2A is a bar chart generated by illustrative embodiments of the present disclosure.

FIG. 2A illustrates a bar chart 200A generated by illustrative embodiments of the present disclosure. As previously described, using the present disclosure, well activities are represented, created and edited in a bar format known as a Gantt chart, along with the option to zoom in on a specific time period and to compare the progress with other wells on the same chart. As shown in FIG. 2A, a well activity listing 202 contains a plurality of well activities 202A-O that correspond to various operations that occur over the life cycle of a well. For example, well activity 202A is coring, 202B is casing, 202C is cementing, 202D is cost estimates and authorization for expenditure ("AFE"), 202E is daily operation, 202F is kick, 202G is logging, 202H is pipe tally, 202I is sidewall coring, 202J is stimulation, 202K is well planning, 202L is wellbore equipment, 202M is wellhead, 202N is perforation and 202O is production equipment failure.

A time frame indicator 204 is positioned at the lower end of the display. Here, the time frame indicator has been set to a two month time period. However, in alternate embodiments, the time period may be minutes (real-time) to years. A time bar 208 is shown along time frame indicator 204 to allow the user to specify a time period within the two month time period in which to illustrate the bar chart. Side bars 206 may be expanded using a click and drag function in order to increase or decrease the time period as desired. Dependent upon the time period specified, the minutes, days, hours weeks, years, etc. may be illustrated along the bottom of the display at 210. In other embodiments, such as those utilizing mobile devices, time frame indicator 204 may be manipulated using a screen pinch or expansion, or a touch screen tap, to thereby provide a shorter or longer time resolution. The operation and design of such time frame indicators will be understood by those ordinarily skilled in the art having the benefit of this disclosure.

As shown, well activities 202A-O are shown in chronological order as they occur within the defined time period. For example, in FIG. 2A, coring 202A was the first well activity to occur within the time period defined by time bar 208 and production equipment failure 202O was the last well activity to occur within the defined time period. In certain embodiments, when the time period is adjusted to another time period, well activity listing 202 will readjust to then show the first well activity to occur in the newly defined time period, with the remaining well activities following in chronological order as they occur within the newly defined time period.

Extending horizontally across the display are a plurality of event bars 212A-O that correspond to well activities 202A-O. Event bars 212A-O are positioned along the defined time period at the points in time in which they occur. Each row of event bars 212A-O may be varied in different ways such that they may be differentiated from one another. For example, each row may have a different color, shape, etc. As can be seen, certain event bars 212 are only shown on at certain time periods, while event bar 212E is shown extending throughout the entire time period. This, of course, is because daily operations are occurring daily. Also, in certain embodiments, non-production time E(i) and E(ii) may be displayed along event bar 212E in order to convey the ties at which the well in question was down.

Figure 2B:
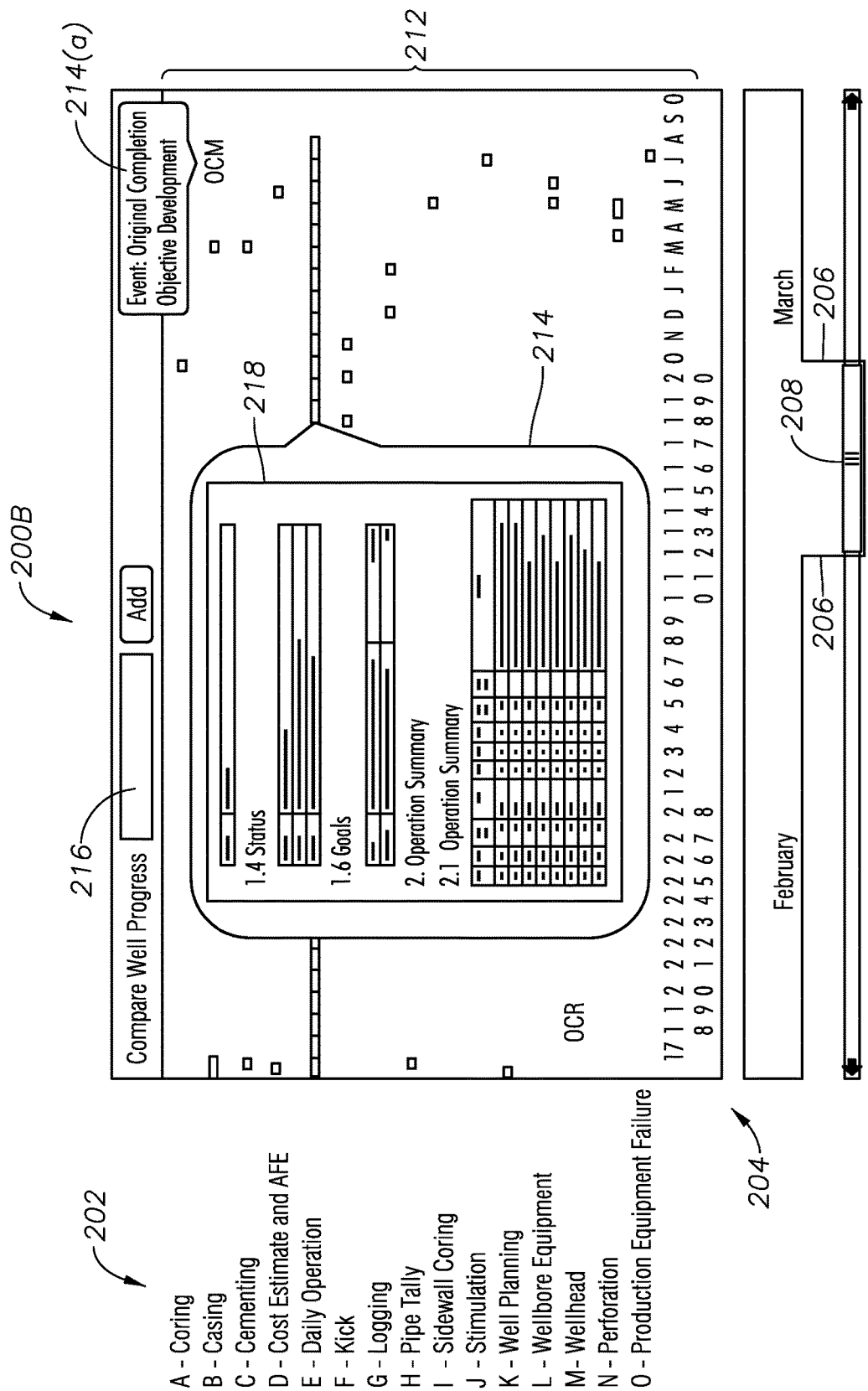
FIG. 2B illustrates a pop-up in which a PDF is displayed in certain embodiments of the present disclosure.

Still referring to FIG. 2A, in certain other embodiments, BCWR system 100 may generate pop-ups 214A-C in response to user-selection of an event bar 212. User-selection may be, for example, accomplished via a touch screen tap or mouse click of an event bar 212 or other display element. Pop-ups 214 may comprises a variety of well related data such as, for example, reports for the specified well activity in textual, audio, pdf format, etc. FIG. 2B illustrates a pop-up 214 in which a pdf 218 is displayed in certain embodiments. Here, the pdf 218 is fully displayed in the pop-up such that the use can read the report without having the open the report. Alternatively, the reports may contain a variety of information such as, for example, the status of activities. The full report may then be viewed or certain portions of the report may be viewed in response to user-selection. For example, although the full report may contain all data capture by BCWR system 100, data may be displayed based upon user-authorization levels, which may be configured by a system administrator. Nevertheless, such activities may be provided to BCWR system 100 via a number of ways, such as, for example, via well data module 112. In other embodiments, user-selection of event bars 212 may redirect the user to a report properties page that may contain, for example, the event code, event start/end dates, report name and date, wellbore, etc.

Alternatively, a right-click or tap may also forward the user to a report properties page. In other embodiments, user-selection of an event bar 212 may also zoom time frame indicator 204 to the time period in which the selected event occurs. In yet other embodiments, the pop-ups 214 may float freely on the display instead of being shown in response to user-selection. For example, pop-up 214(a) identifies the event Original Completion Objective ("OCM") which corresponds to a group of activities during a certain time period as reflected by the shaded area. Pop-up 214(b), however, floats adjacent to non-productive time E(i) to convey to the user that tapping E(i) will bring up the PDF report. Pop-up 214(c) floats adjacent to activity 202M to convey the status of the corresponding event status, Tubing Assembly Status: Installed. Pop-up 214(d) is akin to pop-up 214(a) in that it also identifies an Event, Original Drilling Objective ("ODR"), which corresponds to a group of activities during the shaded time period.

In certain other embodiments, BCWR system 100 may also display a compare well progress window 216. As will be described later, window 216 allows entry of another well which, in response, instructs BCWR system 100 to generate a bar char containing the original well and the newly entered well. In turn, a comparison may be made of the two wells.

Figure 2C:
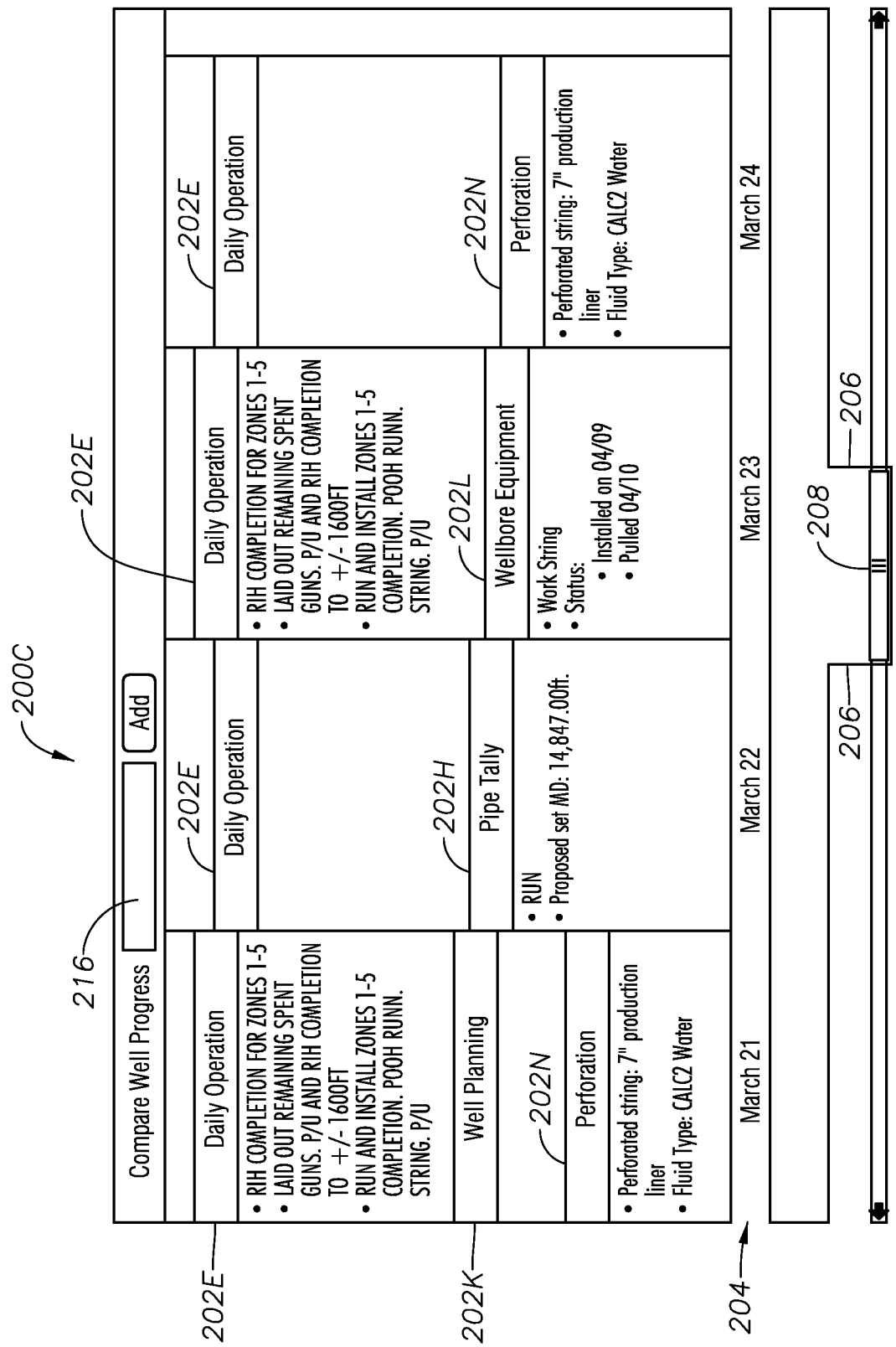
FIG. 2C is a bar chart having a four day time period that was generated using certain illustrative embodiments of the present disclosure.

FIG. 2C illustrates bar chart 200C having a four day time period that was generated using certain illustrative embodiments of the present invention. Bar chart 200C is somewhat similar to bar chart 200A described with reference to FIGS. 2A and 2B and, therefore, may be best understood with reference thereto, where like numerals indicate like elements. In this example, however, the time period set using time bar 208 is four days, beginning at March 23. As a result, BCWR system 100 has displayed four columns, wherein each one displays the well activities which occur on that given day. On the first day in the defined four day time period, daily operation 202E, well planning 202K and perforation 202N are listed, along with activity information positioned under each. Well listings 202 and/or the activity information may also be user-selected as previously described, to thereby view related data on each. The second through fourth days are displayed in like manner. As previously described, the well activities 202 in each daily column are listed in chronological order based upon the defined time period. Accordingly, BCWR system 100 may display the bar charts over any defined time period, such as, for example, minutes to years.

Figure 2D:
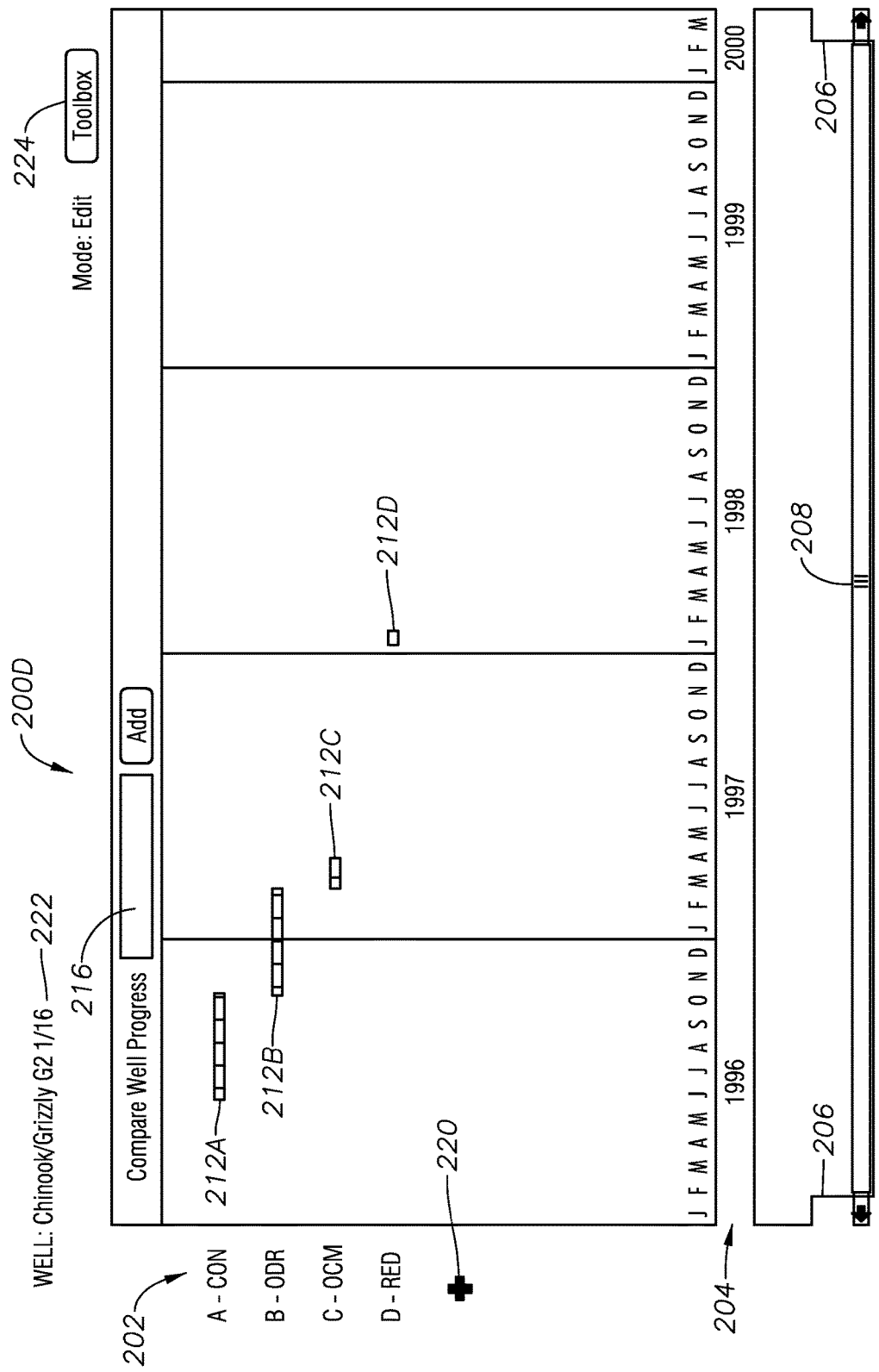
FIG. 2D illustrates a bar chart being created during well planning using illustrative embodiments of the present disclosure.

FIG. 2D illustrates a bar chart 200D being created during well planning using illustrative embodiments of the present invention. Bar chart 200D is somewhat similar to bar chart 200A described with reference to FIGS. 2A and 2B and, therefore, may be best understood with reference thereto, where like numerals indicate like elements. Here, however, bar chart 200D is illustrated to show how BCWR system 100 may also be utilized to create a well plan bar chart. In certain embodiments, well activities listing 202 may be created by user-selecting (click, touch, etc.) add icon 220 which allows addition of well activities 202A-D and beyond. Once user-selected, well activities 202 may be edited (added, named, deleted, etc.) as desired. In some embodiments, as the user begins to type the name of the well activity, BCWR system 100 suggests other available activities. A time period may be defined using time bar 208 as previously described.

As well activities 202A-D are added, BCWR system 100 automatically populates corresponding event bars 212A-D in certain embodiments. In the displayed embodiment, event bars 212A-D may then be user-selected, resized, and/or moved (i.e., their time period may be shortened or lengthened, or otherwise moved, for example). Adjustment of the time period may be achieved by dragging the edge of the event bar. Also, BCWR system 100 may display the time period length as the event bar is being edited. Through user-selection (click, tap, etc.), the user may navigate between event bars 212A-D as desired. Also, in certain embodiments, double-tapping on an event bar will zoom the defined time frame to the time period the corresponding well activity is planned to occur. In other embodiments, a user-selection (tap and hold, for example) will result in BCWR system 100 allowing the user to select an event properties page whereby the user may review and/or edit the corresponding event. In addition, other features of bar chart 200D may be edited, such as, for example, well name 222.

The illustrative bar charts described herein may also include a toolbox icon 224, which contains all well activities/reports available to the user. User-selection of toolbox icon 224 will initiate BCWR system 100 to begin building a chart. For example, in certain embodiments, the Toolbox is utilized for easy access to various system components to build a chart, diagram or forms. In the case of the illustrated bar charts, the chart may be generated by selecting objects (activities 202, for example) and placing each on the correct time period along the chart.

In other well planning embodiments, BCWR system 100 may generate a template automatically using data available from other wells in close proximity to the well being planned. BCWR system 100's selection of these other wells may be based on the location (lat/long, region, etc.) of the planned well. BCWR system 100's estimation of well activity time periods, materials or costs may be estimated automatically based on the data previously recorded for the specified area and uploaded via well data module 112. For example, if three wells were previously completed, BCWR system 100 may estimate the time for a planned well's hole cleaning activity (and cost) based on an average of these three wells. Once BCWR system 100 generates the template (as shown in FIG. 2D, for example), BCWR system 100 may suggest the defined time period for the bar chart and/or event bars—thereafter, the user may edit the time period and/or event bars are desired. During editing, BCWR system 100 may display the time period length for an accurate selection. For example, when a user drops an object on the chart, the start and end for that particular activity can be displayed by BCWR system 100 on the tool tip, so the user can select the accurate place on the graph.

In yet other embodiments, the event bars 212 described herein may be updated in real-time based upon well data received from remote or local sources. As previously described, well data module 112 may be utilized to accomplish this functionality. Thus, as events occur at the well site and are sensed by sensors located there, the data is transmitted to BCWR system 100, whereby it updates event bars 212 with this data. Such an update may result in a change in the time period for the event bar or an update to the report linked to the event bar, for example.

Figure 3:
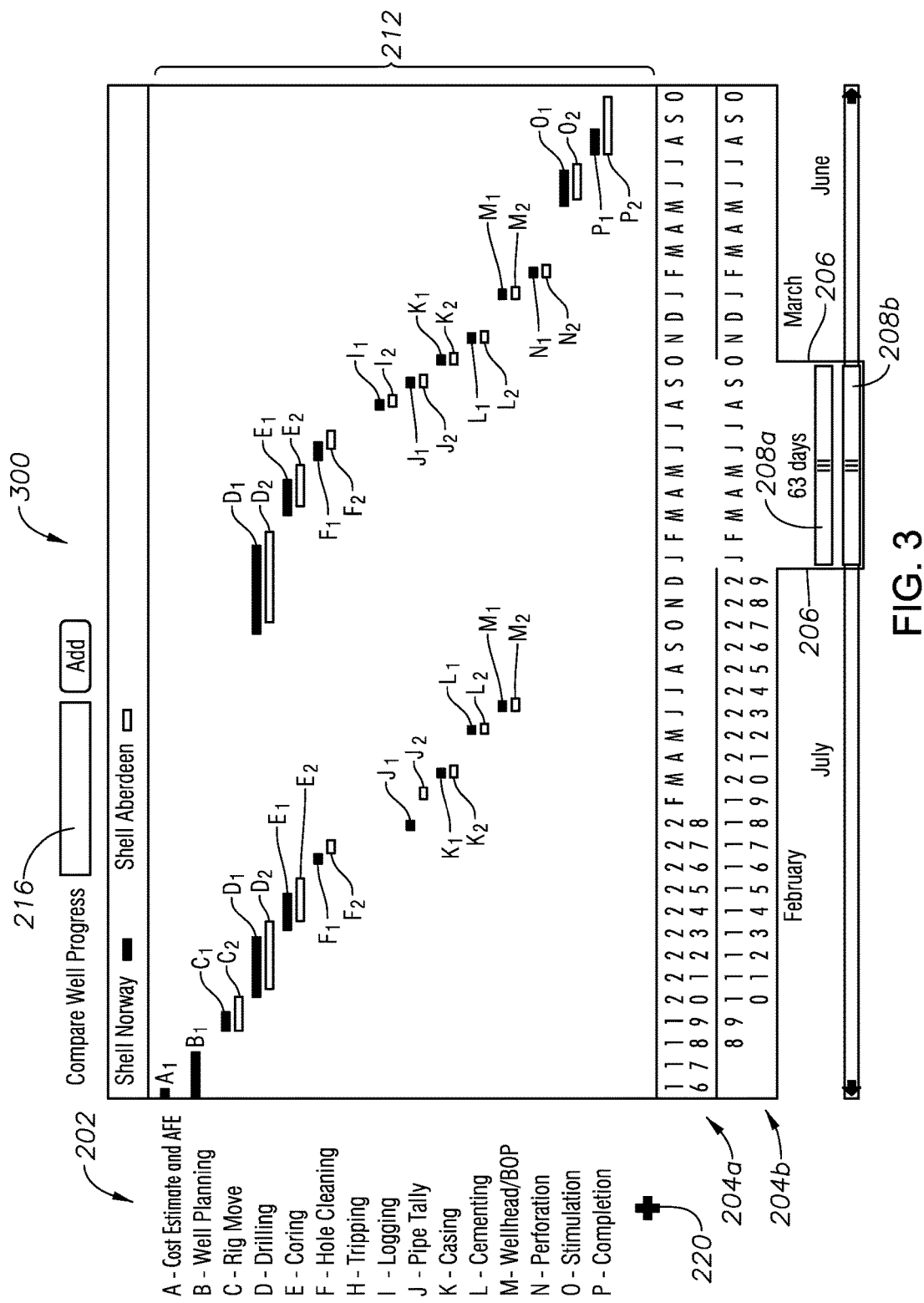
FIG. 3 illustrates a bar chart that compares two wells, generated using illustrative embodiments of the present disclosure.

Moreover, as previously described, BCWR system 100 may also provide the option to compare two or more wells. For example, BCWR system 100 may generate a bar chart that simultaneously plots a planned and actual well. As a result, planned time may be compared with actual times of historical well activities for other wells. FIG. 3 illustrates a bar chart 300 that compares two wells, generated using illustrative embodiments of the present disclosure. Bar chart 300 is somewhat similar to bar chart 200A described with reference to FIGS. 2A and 2B and, therefore, may be best understood with reference thereto, where like numerals indicate like elements. In this embodiment, however, BCWR system 100 has simultaneously displayed a selected first and second well, thus allowing comparison of the two. A first and second time bar 208a,b and time frame indicators 204a,b, respectively, are utilized to defined the desired time frame in which to illustrate the first and second well.

Event bars 212 are displayed in like manner to that previously described. Here, however, first and second event bars 1 and 2 are displayed for each well activity 202. For example, rig move 212C has two corresponding event bars 212C1 and 212C2 for the first and second wells, respectively. Over the defined time period, well activities 212A-M are conducted in chronological order. After well activity 212M1 and 212M2 are conducted, the well activity 212D-212P are then conducted as shown. Additionally, in such illustrative embodiments, reports linked to the event bars may be copied or moved between event bars in response to user-selection. For example, an event bar may be clicked to bring up the report, followed by a click and drag to another event bar in order to copy the report. The event bars corresponding to the first and second wells may be differentiated in a variety of ways, such as, for example, symbols or colors.

Figure 4:
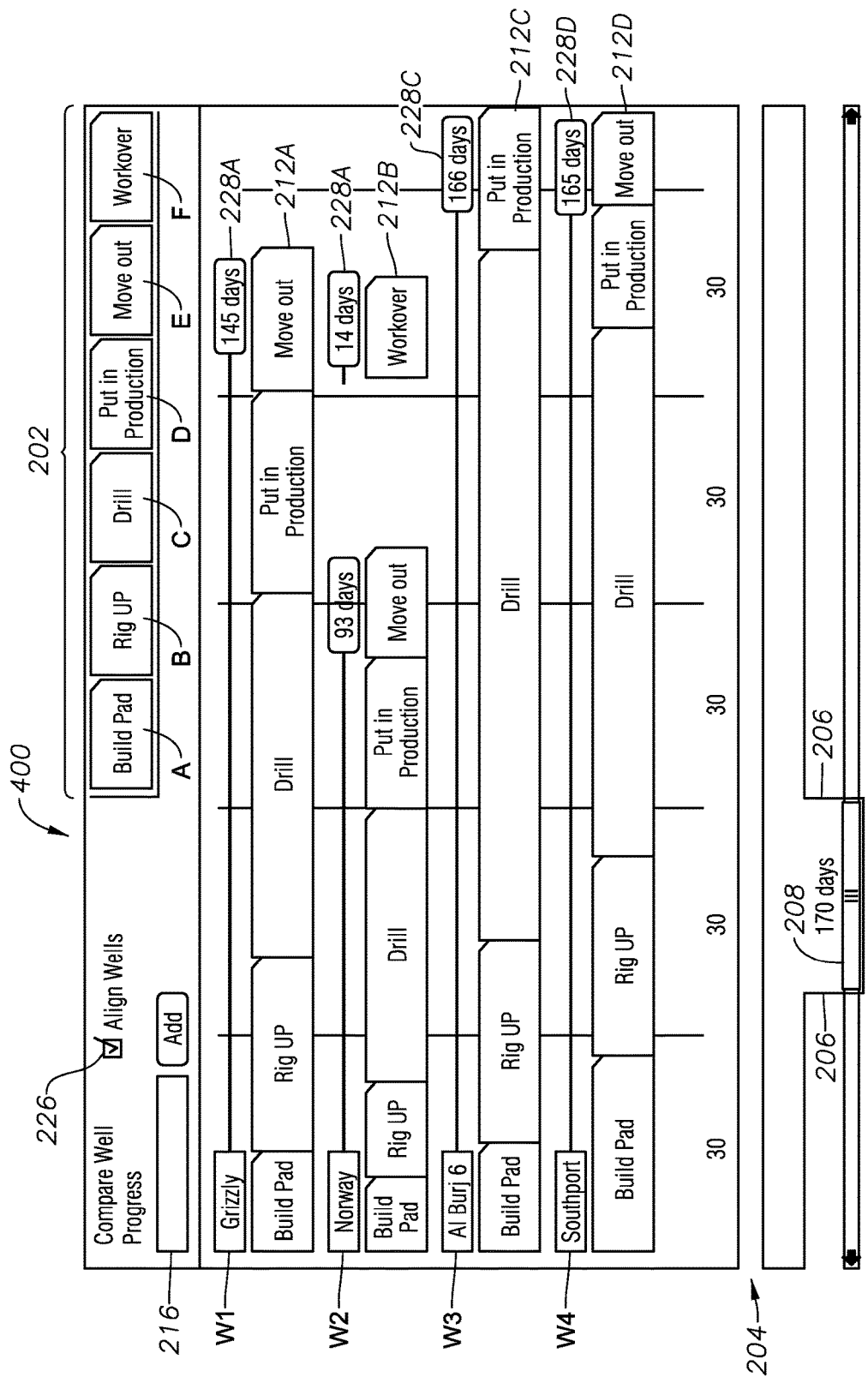
FIG. 4 illustrates yet another bar chart in which a plurality of well activities are aligned, generated using illustrative embodiments of the present disclosure.

FIG. 4 illustrates yet another bar chart 400 in which a plurality of well activities are aligned, generated using illustrative embodiments of the present disclosure. In bar chart 400, well activity listing 202 is positioned along the top of the display, showing well activities 202A-F in chronological order based upon the defined time period set as previously described. Here, well activities 200A-F are listed as build pad 202A, rig UP 202B, drill 202C, put in production 202D, move out 202E and workover 202F, although others may be utilized in other embodiments. BCWR system 100 displays an align wells icon 226 at the top of the display also, utilized to prompt the system to aligned the wells entered via compare well progress window 216. In this embodiment, four wells W1 . . . W4 have been charted, each having a corresponding event bars 212A-D, wherein each event bar comprises the well activities 202A-F in chronological order. Furthermore, each event bar 212A-F has a corresponding duration bar 228A-D, respectively, which visually conveys their associated time durations. Otherwise, bar chart 400 may be manipulated, user-selected, etc., as previously described.

Figure 5:
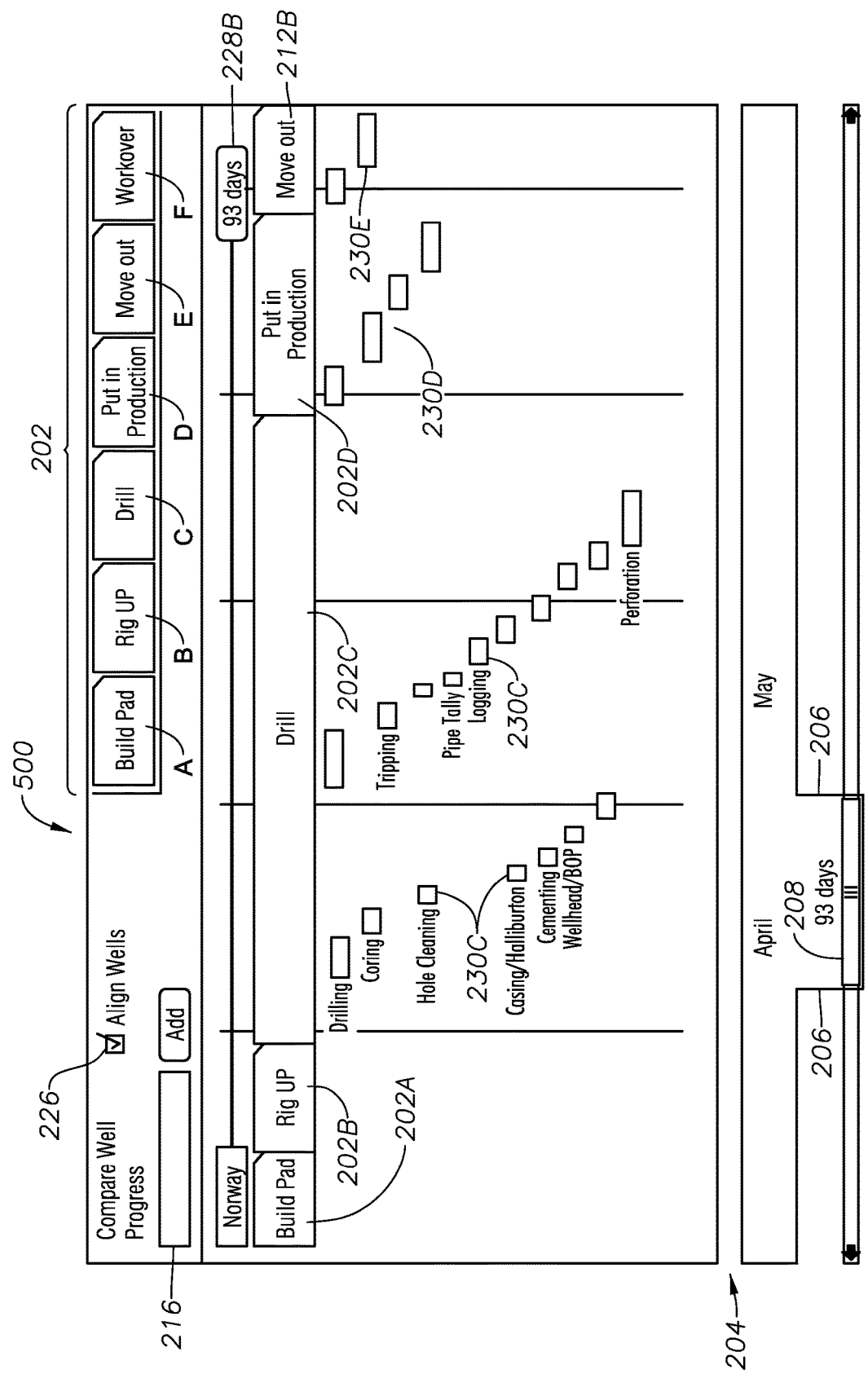
FIG. 5 illustrates yet another bar chart in which a sub-event bar is illustrated, as generated using illustrative embodiments of the present disclosure.

FIG. 5 illustrates yet another bar chart 500 in which a sub-event bar is illustrated, as generated using illustrative embodiments of the present disclosure. Bar chart 500 is somewhat similar to bar chart 400 described with reference to FIG. 4 and, therefore, may be best understood with reference thereto, where like numerals indicate like elements. Here, however, a plurality of sub-event bars 230C-E are displayed which correspond to the well activities along event bar 212B above them. In FIG. 5, for example, well activities 202C, 202D and 202E have a plurality of corresponding sub-event bars 230C-E, respectively, below each. In certain embodiments, the sub-event bars 230C-E represent other well activities, while in others they may identify personnel conducting a specific job. In yet other embodiments, user-selection of the event bars will result in BCWR system 100 displaying a pop-up that contains well related data, as previously described. Bar chart 500 may be edited in a variety of ways, such as, for example, well activities 202 may be dragged and drop within the chart and then stretched/shrunk to make a desired time period.

In yet other illustrative embodiments, the well activities and/or event bars may be temperature-color coded. For example, yellow may represent the starting activity (rig pad construction, for example), moving through to red which represents the core well activity (drilling, for example), then cools off to blue when moving the rig out. In other embodiments, the bar charts can be switched to show cost per well activity, cost versus time, planned well activity versus actual well activities, average well activity versus actual well activity, or average well activity versus planned well activity. Also, for any chart, the X and Y coordinates may be changed so that the user can view the desired representation.

The foregoing methods and systems described herein provide easy to navigate visual representations of the drilling progress and the ability to compare wells. Additionally, the present disclosed bar charting system provides the ability to (1) read a selected well related data without opening an actual report; (2) select and zoom in/out for better resolution on a specific time frame; (3) visually represent of a well project schedule; and integrate real-time data into the bar chart. Accordingly, using the present disclosure, a well may be, planned, stimulated, etc., or an existing wellbore may be altered in real-time and/or further operations may be altered. In addition, well equipment may be identified and prepared based upon the determined well plan, and the wellbore is then drilled, stimulated, altered and/or completed in accordance to the determined well plan.

The exemplary embodiments described herein further relate to any one or more of the following paragraphs:

1. A computer-implemented method to display bar charts that represent well activities, the method comprising displaying a well activity listing comprising a plurality of well activities listed in chronological order, the well activities being operations that occur over a life cycle of a first well; displaying a plurality of event bars, wherein each bar corresponds to a different well activity; displaying a time frame indicator; and defining a time period in which to display the event bars using the time frame indicator, wherein the event bars are displayed at a first time at which the corresponding well activity occurs within the defined time period.

2. A computer-implemented method as defined in paragraph 1, further comprising receiving real-time data related to the well activities; and updating the event bars to reflect the real-time data.

3. A computer-implemented method as defined in any of paragraphs 1-2, further comprising displaying event bars for the first well and a second well simultaneously.

4. A computer-implemented method as defined in any of paragraphs 1-3, further comprising rearranging the well activities within the well activity listing according to the defined time period.

5. A computer-implemented method as defined in any of paragraphs 1-4, wherein the well activities are for a planned well; and the time at which each event bar occurs is determined based upon prior well activities for other wells.

6. A computer-implemented method as defined in any of paragraphs 1-5, further comprising resizing the event bars to reflect a different second time within the defined time period.

7. A computer-implemented method as defined in any of paragraphs 1-6, further comprising moving the event bars using a drag-and-drop functionality.

8. A computer-implemented method as defined in any of paragraphs 1-7, wherein each well activity is displayed within its corresponding event bar in chronological order; or each well activity is positioned next to its corresponding event bar.

9. A computer-implemented method as defined in any of paragraphs 1-8, wherein each well activity is positioned next to its corresponding event bar, the method further comprising displaying the well activity listing vertically; and displaying the event bars horizontally.

10. A computer-implemented method as defined in any of paragraphs 1-9, further comprising displaying a time duration bar for each event bar.

11. A computer-implemented method as defined in any of paragraphs 1-10, wherein each well activity is displayed within its corresponding event bar, the method further comprising simultaneously displaying a sub-event bar that corresponds to one of the well activities, the sub-event bar showing a plurality of well activities that occur within the one of the well activities.

12. A computer-implemented method as defined in any of paragraphs 1-11, further comprising selecting an event bar; and displaying a pop-up containing data related to the selected event bar.

13. A computer-implemented method as defined in any of paragraphs 1-12, wherein the selecting of the event bar is achieved by tapping or clicking the event bar.

Furthermore, the exemplary methodologies described herein may be implemented by a system including processing circuitry or a computer program product including instructions which, when executed by at least one processor, causes the processor to perform any of the methodology described herein.

Although various embodiments and methodologies have been shown and described, the present disclosure is not limited to such embodiments and methodologies and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method to display bar charts that represent well activities, the method comprising:
    displaying a well activity listing for a first well comprising a plurality of well activities listed in chronological order, the well activities being operations that occur over a life cycle of a first well;
    receiving well drilling data from a plurality of wells;
    automatically determining event data in response to the well activities, wherein the event data is determined from the well drilling data, wherein the event data comprises a plurality of well activities, and a time amount associated with each well activity;
    displaying a plurality of event bars, wherein each event bar corresponds to a different well activity;
    displaying a time frame indicator;
    receiving time bar feedback with the time frame indicator from a user;
    defining, in response to the time bar feedback, a time period in which to display the event bars, wherein the event bars are displayed at a first time at which the corresponding well activity occurs within the defined time period;
    receiving a pop up indication from the user;
    displaying a pop up for a first event bar associated with a first well activity in response to the pop up indication;
    receiving a pop up selection from the user;
    accessing activity information associated with the first well activity in response to the pop up selection; and
    presenting the activity information in response to the pop up selection.

2. A computer-implemented method as defined in claim 1, further comprising:
    receiving real-time data related to the well activities; and
    updating the event bars to reflect the real-time data.

3. A computer-implemented method as defined in claim 1, further comprising displaying event bars for the first well and a second well simultaneously.

4. A computer-implemented method as defined in claim 1, further comprising rearranging the well activities within the well activity listing according to the defined time period.

5. A computer-implemented method as defined in claim 1, wherein:
    the well activities are for a planned well; and
    the time at which each event bar occurs is determined based upon prior well activities from the plurality of wells.

6. A computer-implemented method as defined in claim 1, further comprising resizing the event bars to reflect a different second time within the defined time period.

7. A computer-implemented method as defined in claim 1, further comprising moving the event bars using a drag-and-drop functionality.

8. A computer-implemented method as defined in claim 1, wherein:
    each well activity is displayed within its corresponding event bar in chronological order; or
    each well activity is positioned next to its corresponding event bar.

9. A computer-implemented method as defined in claim 8, wherein each well activity is positioned next to its corresponding event bar, the method further comprising:
    displaying the well activity listing vertically; and
    displaying the event bars horizontally.

10. A computer-implemented method as defined in claim 8, further comprising displaying a time duration bar for each event bar.

11. A computer-implemented method as defined in claim 8, wherein each well activity is displayed within its corresponding event bar, the method further comprising simultaneously displaying a sub-event bar that corresponds to one of the well activities, the sub-event bar showing a plurality of well activities that occur within the one of the well activities.

12. A computer-implemented method as defined in claim 1, wherein the pop up selection is a selection of one of the event bars.

13. A computer-implemented method as defined in claim 12, wherein the selecting of the event bar is achieved by tapping or clicking the event bar.

14. A system comprising processing circuitry to implement the method of claim 1.

15. A non-transitory computer program product comprising instructions which, when executed by at least one processor, causes the processor to perform the method of claim 1.

16. A computer-implemented method as defined in claim 1, wherein the plurality of wells are a plurality of wells within close physical proximity of the first well.

* * * * *